3,630,974
TERNARY RUBBER BLEND
Lewis T. Ladocsi, South Orange, and Donald G. Young, Mountainside, N.J., assignors to Esso Research and Engineering Company
No Drawing. Continuation of application Ser. No. 657,493, Aug. 1, 1967. This application Jan. 29, 1970, Ser. No. 6,969
Int. Cl. C08c 9/04, 9/08, 9/10
U.S. Cl. 260—5                    9 Claims

ABSTRACT OF THE DISCLOSURE

A three part blend of ethylene-propylene terpolymer, halobutyl rubber, and a high unsaturation rubber, has surprisingly improved physical properties after vulcanization.

CROSS-REFERENCE TO PRIOR APPLICATION

This application is a continuation of United States patent application S.N. 657,493, filed Aug. 1, 1967, entitled "Ternary Rubber Blend," now Defensive Publication T857044.

BACKGROUND OF THE INVENTION

Terpolymers based on ethylene and a higher alpha olefin are now well known in the art. Also well known are halobutyl rubbers, as are blends of terpolymers, or halobutyl rubber with high unsaturation rubbers.

A primary reason for using these blends, in such articles as tires, is that the terpolymer or halobutyl rubber serves as a macromolecular antiozonant-antioxidant. Because the low functionality rubbers are not compatible with high unsaturation rubbers in vulcanization, it is generally necessary to utilize as little terpolymer or halobutyl rubber as possible in blends to retain physical properties and minimize adhesion problems. With higher levels of the chlorobutyl or terpolymer, economic deficits are also incurred.

Blending terpolymers into high unsaturation rubbers is known to enhance their static ozone resistance, but such blends are limited to low concentrations of terpolymer ($\leq 30\%$) because of the basic incompatibility of the polymers. This incompatibility also limits the performance of these blends in dynamic ozone and heat-flex service conditions, even within the 30% limit.

Blends containing halobutyl rubbers, while quite effective in heat-flex enviornments (providing the percent of halobutyl is 50% or higher), have static ozone and dynamic ozone performance limitations at practical concentration levels.

In view of the above, it is quite surprising that the addition of relatively small amounts of halobutyl ($\sim 25\%$ rubber) to a terpolymer/high unsaturation rubber blend yields excellent dynamic ozone resistance and heat-flex resistance. These blends are not adversely affected in terms of physical properties and static ozone resistance, and suffer minimal loss in adhesion compatibility.

SUMMARY OF THE INVENTION

In this invention, 15–30 wt. percent, preferably 15–20 wt. percent of terpolymer, is blended with 15–30 wt. percent, preferably 25–30 wt. percent of the halobutyl, and 40–70 wt. percent, preferably 50–65 wt. percent of the high unsaturation rubber. The amount of high unsaturation rubber used will depend upon how much of the other two components are put into the blend, the amount of high unsaturation rubber being, in essence, that amount which is necessary to complete a 100% mixture of total rubber. These blends after vulcanization have surprisingly improved dynamic ozone and heat-flex resistance, particularly when compared with terpolymer/high unsaturation rubber blends. In addition, these blends retain the high static ozone resistance and good physical properties characteristic of binary blends of terpoymer and high unsaturation rubber.

DETAILED DESCRIPTION

The terpolymers of this invention are copolymers of ethylene with a higher alpha olefin, and a small amount of a nonconjugated diolefin which is incorporated to facilitate vulcanization of the product. These terpolymers, when they are composed of ethylene, propylene, and a diene, are becoming known in the art as EPDM polymers.

The higher alpha olefin is generally a $C_3$–$C_{10}$, and preferably a $C_3$–$C_6$ alpha olefin. Representative examples are propylene; 1 - butene; 4-methyl-1-pentene; 1-pentene; 1-octene; 5-methyl-1-nonene; 1-decene; and 5,6,6-trimethyl-1-heptene. The most preferred higher alpha olefin is propylene.

The nonconjugated diolefin may be a straight chain or cyclic hydrocarbon diolefin having from 6–15 carbon atoms, such as dicyclopentadiene; tetrahydroindene, including alkyl substituted tetrahydroindenes; 5-methylene-2-norbornene; 5-vinyl-2-norbornene; 2-methyl-norbornadiene; 2,4-dimethyl-2,7-octadiene; 1,4-hexadiene; 5-ethylidene norbornene; and 3-methallyl cyclopentene. Preferred are 5 - methylene-2-norbornene; dicyclopentadiene; 1,4-hexadiene; 5-ethylidene norbornene; and 4,7,8,9-tetrahydroindene. Especially suitable is 5-methylene-2-norbornene.

In these terpolymers, the ethylene monomer unit concentration ranges, in general, from about 20 to 80% by weight. The concentration of $C_3$–$C_{10}$ alpha olefin monomer units ranges from about 75 to 15% by weight. The nonconjugated diolefin monomer content is generally present in an amount sufficient to provide for sulfur curability, i.e., at least at about .01 gram moles per 100 grams of terpolymer; while the maximum amount present by weight should be such as not to interfere seriously with the elastic character of the product—i.e., not over about 20% by weight. In most instances, the diolefin content will not be greater than 10% of the total weight of the terpolymer, and the most preferred range is about .1 to 5 mole percent. When very small amounts of terpolymer are used, the amount of ethylene or higher alpha olefin is somewhat higher than the ranges shown above.

The halobutyl rubbers of this invention are formed by halogenating butyl rubber. Butyl rubber is a copolymer of a major proportion, preferably 85–99.5 wt. percent of an isoolefin, and a minor proportion, preferably 15–0.5 wt. percent of a multiolefin. The isoolefin is generally a $C_4$–$C_8$ olefin such as isobutylene, or 3-methyl butene-1. Preferred is isobutylene. The multiolefin generally has about 4–14 carbon atoms; representative examples are myrcene, isoprene, and butadiene. Preferred are isoprene and butadiene, most preferred is isoprene. The nature and production of butyl rubber is well described in the prior art, see U.S. Pat. 2,356,128, for example.

Halogenated butyl rubber is produced by halogenating these copolymers in a manner which does not substantially degrade its molecular weight, but nevertheless gives a rubbery product of substantially different properties than the unhalogenated material. Butyl rubber may be halogenated at temperatures of −50° to 200° C., preferably 0° to 100° C., at pressures of 0.5 to 900 p.s.i.a. with a suitable halogenating agent such as gaseous chlorine, liquid bromine, or iodine monochloride. Halogenation may be accomplished in various ways. For example, the halogenating agent, e.g., chlorine, may be added to a solution of the copolymer in a suitable inert liquid organic solvent. The resulting halogenated polymer can be recovered by precipitation with a nonsolvent, spray drying, or by flashing off the hydrocarbon solvent.

Preferably, the degree of halogenation is carefully regulated so that the halogenated copolymer contains at least 0.5 wt. percent of combined halogen, but not more than about one atom of combined fluorine or chlorine per double bond in the polymer, nor more than three atoms of combined bromine or iodine for each double bond. A more detailed description of the formation of halogenated butyl rubber may be found in U.S. Pat. 2,944,578. The preferred halogens are chlorine and bromine, and the most preferred halogen in this invention is chlorine. The preferred chlorinated rubber of this invention has a chlorine content of 1.1–1.3 wt. percent.

The high unsaturation rubbers of this invention include natural rubber, polybutadiene, SBR (a copolymer of styrene and butadiene), nitrile rubber (a copolymer of acrylonitrile and butadiene), polychloroprene (a homopolymer of 2-chlorobutadiene-1,3), and synthetic polyisoprene. The preferred highly unsaturated rubbers are the hydrocarbon rubbers, and most preferred is natural rubber.

Various fillers can be used in the blend of this invention and these include a variety of carbon blacks (such as SAF, HAF, SRF and EPC), clays, silicas, carbonates, oils, resins, and waxes. When carbon black is used, it is generally added in an amount of about 20–200, preferably 30–150 parts per 100 parts of polymer by weight. A suitable exemplary formulation contains 80 parts of carbon black per 100 of rubber, and 10 parts oil per 100 of rubber.

The blends are cured with conventional curatives for high unsaturated or chlorobutyl rubbers. These include sulfur, alkylphenol disulfide, zinc oxide, sulfenamide derivatives, guanidines, and benzothiazyl disulfide.

The blends are mixed in standard rubber mixing equipment such as a rubber mill, or a Banbury mixer.

The invention may be more fully understood by reference to the following examples, wherein all parts shown are by weight.

EXAMPLE 1

Binary blends of EPDM (Vistalon 4504 and Royalene 301) with natural rubber were prepared, cured and tested as shown in Table I.

| Base formulation A consisted of: | |
|---|---|
| MT black | 60 |
| HAF-LS | 20 |
| Flexon 840 oil | 10 |
| Sunolite 127 wax | 3 |
| Stearic acid | 1 |

| Cure systems B and C consisted of: | B | C |
|---|---|---|
| Zinc oxide | 5 | 5 |
| Vultac 5 a | 1.25 | |
| MBTS b | 0.75 | 1.5 |
| Sulfur | 0.5 | Varied |
| TMTDS c | | 0.2 | a An alkylphenol disulfide.
b Benzothiazyl disulfide.
c Tetramethylthiuram disulfide.

TABLE I

| Compound | 1 | 2 | 3 | 4 | 5 | 6 |
|---|---|---|---|---|---|---|
| Base formulation | A | A | A | A | A | A |
| Natural rubber | 70 | 65 | 85 | 80 | 80 | 80 |
| Vistalon 4504 a | 30 | 35 | | | 20 | |
| Royalene 301 b | | | 15 | 20 | | 20 |
| Cure system | C | C | C | C | B | B |
| Sulfur c | 1.05 | 0.98 | 1.28 | 1.20 | | |
| Cured 30 min. at 307° F.: | | | | | | |
| Shore "A" | 61 | 62 | 61 | 62 | 60 | 60 |
| 300% modulus, p.s.i. | 1,150 | 1,050 | 1,200 | 1,210 | 1,230 | 1,190 |
| Tensile, p.s.i. | 1,540 | 1,170 | 1,770 | 1,840 | 1,930 | 1,880 |
| Elongation, percent | 400 | 350 | 450 | 460 | 460 | 470 |
| Static ozone resistance at 50 p.p.h.m., 20% extension, 24 hr. relax, 100° F., hrs. to initial cracking | 1 | >200 | 120 | >200 | 1 | >200 |
| Dynamic ozone resistance at 100 p.p.h.m., 25–50% extension, 30 cycles/min., 100° F., hrs. to visible cracking | 0.5 | 0.5 | 0.5 | 0.5 | 0.5 | 0.5 |
| DeMattia Flexometer ASTM, D-430, hrs. to cracking: | | | | | | |
| Middle | 0.75 | 0.75 | 0.75 | 0.75 | 24 | 24 |
| Break | 4 | 1 | 4 | 3 | 72 | 72 | a Terpolymer of 60 wt. percent ethylene, 37 wt. percent propylene, and 3 wt. percent of 5-methylene-2-norbornene.
b Ethylene-propylene terpolymer containing 2–5 wt. percent of dicyclopentadiene as third monomer, 70±10 wt. percent ethylene and the balance propylene.
c The sulfur level was varied, in direct proportion to the natural rubber content, to achieve the best possible maintenance of physical properties with varied EPDM content.

As can be seen from the table, the static ozone resistance of such blends is high, providing sufficient EPDM is utilized (20 to 35%). However, none of the blends have good dynamic ozone or flex resistance. A highly ozone and flex resistant compound would resist cracking for >10 hours in the dynamic ozone test and >100 hours in the DeMattia Flexometer test (compared with 0.5 hours and 24 hours, respectively, for the best compounds in Table I). Also, the physical properties, particularly tensile strength, of these blends can be seen to vary (from 1840 to 1170 p.s.i.) in an inverse relationship to the amount of EPDM employed. This change in properties with EPDM content, plus their low dynamic ozone and flex resistance, is evidence of the basic polymer incompatibility in such vulcanizates.

EXAMPLE 2

Binary blends of chlorinated butyl rubber and natural rubber were evaluated with the results shown in Table II. As shown by the data for compound 2, the static ozone resistance and flex resistance are good for chlorobutyl/natural rubber blends containing 50% of chlorobutyl. However, the dynamic ozone resistance is only moderate (5.5 hours to cracking). Notably, 25% of chlorobutyl (compound 1) does not provide good static ozone, dynamic ozone or flex resistance in these tests.

TABLE II

| Compound | 1 | 2 |
|---|---|---|
| Base formulation | A | A |
| Natural rubber | 75 | 50 |
| Butyl HT 10-68 a | 25 | 50 |
| Cure system | B | B |
| Cured 30 min. at 307° F.: | | |
| Shore "A" | 50 | 54 |
| 300% modulus, p.s.i. | 910 | 1,150 |
| Tensile, p.s.i. | 2,120 | 1,780 |
| Elongation, percent | 510 | 440 |
| Static ozone resistance at 50 p.p.h.m., 20% extension, 24 hr. relax, 100° F., hrs. to initial cracking | 25 | 312 |
| Dynamic ozone resistance, 100 p.p.h.m., 25–50% extension, 30 cycles/min., 100° F., hrs. to visible cracking | 1.5 | 5.5 |
| DeMattia Flexometer, ASTM D-430, 180° to 60° included angle, 300 cycles/min., 158° F., hrs. to crack | 24 | >168 | a Chlorobutyl rubber containing 1.2 wt. percent chlorine, slightly more than 97 wt. percent isobutylene, and 1.4 wt. percent isoprene, and having a Mooney viscosity of 55 (260° F.).

EXAMPLE 3

Ternary blends of EPDM, chlorinated butyl and natural rubber were prepared, cured and tested as shown in Table III.

TABLE III

| Run number | 1 | 2 | 3 | 4 |
|---|---|---|---|---|
| Base formulation | A | A | A | A |
| Butyl HT 10-68 [a] | 15 | 20 | 25 | 30 |
| Vistalon 4504 [b] | 20 | 20 | 20 | 20 |
| Natural rubber | 65 | 60 | 55 | 50 |
| Cure system | B | B | B | B |
| Hardness, Shore "A" | 53 | 54 | 54 | 57 |
| 300% modulus, p.s.i. | 950 | 950 | 960 | 1,000 |
| Tensile strength, p.s.i. | 1,730 | 1,630 | 1,530 | 1,630 |
| Elongation, percent | 490 | 490 | 450 | 470 |
| Static ozone resistance at 50 p.p.h.m., 20% extension, 24 hr. relax, 100° F., hrs to initial cracking | 148 | >500 | >500 | >500 |
| Dynamic ozone resistance at 100 p.p.h.m., 25-50% extension, 30 cycles/min., 100° F., hrs to visible cracking | 1 | 1 | 16 | 30 |
| DeMattia Flexometer ASTM, D-430, hrs. to cracking: | | | | |
| Middle | | | >168 | >168 |
| Break | 46 | 141 | >168 | >168 |

[a] Chlorobutyl rubber containing 1.2 wt. percent chlorine, slightly more than 97 wt. percent isobutylene, and 1.4 wt. percent isoprene, and having a Mooney viscosity of 55 (260° F.).
[b] Terpolymer of 60 wt. percent ethylene, 37 wt. percent propylene, and 3 wt. percent of 5-methylene-2-norbornene.

The data clearly show that the static and dynamic ozone and flex resistances of such blends are excellent, particularly when 25% or greater of chlorobutyl and 20% of EPDM are employed. Comparison with the data in Tables I and II shows that such ternary blends have much higher dynamic ozone resistance than either EPDM/natural rubber (16–30 hours vs. 0.5 hours to cracking) or chlorobutyl/natural rubber blends (16–30 vs. 5.5 hours to cracking), and the flex resistance of ternary blends is greatly improved over binary EPDM/natural rubber blends (168 hours vs. 0.75–24 hours to cracking). Also, the physical properties of ternary blends are good, and they are relatively constant over the range of 15 to 30% of chlorobutyl. This is in contrast with the data for EPDM/natural rubber blends (Table I), where the physical properties vary considerably over the range of 15 to 35% of EPDM required to obtain good static ozone resistance.

Also notable is that ternary blends provide high performance properties when employing only a total 45% low unsaturation polymer (chlorobutyl plus EPDM content). This makes them of commercial interest because, as indicated previously, it is desirable to minimize the low unsaturation polymer content to minimize problems related to compatibility, adhesion and economic deficits incurred by employing such macromolecular antiozonant-antioxidants.

EXAMPLE 4

Binary blends of terpolymer and halobutyl, while they may have good ozone and flex resistance, are not practical for tire applications because they have poor adhesion compatibility and poor uncured tack. Furthermore, such blends have high material costs, which make them economically unfeasible for most applications.

This invention has been described in connection with certain specific embodiments thereof; however, it should be understood that these are by way of example, rather than by way of limitation, and it is not intended that the invention be restricted thereby.

What is claimed is:

1. An elastomer blend of improved properties comprising:
    (a) about 15–30 wt. percent of an ethylene $C_3$–$C_{10}$ alpha olefin non-conjugated diolefin terpolymer rubber,
    (b) about 15–30 wt. percent of a halobutyl rubber, and
    (c) about 70–40 wt. percent of a high unsaturation rubber.
2. The elastomer blend of claim 1 wherein the $C_3$–$C_{10}$ alpha olefin is propylene.
3. The elastomer blend of claim 2 which contains 15–20 wt. percent of terpolymer.
4. The elastomer blend of claim 1 which contains about 25–30 wt. percent of the halobutyl rubber.
5. The elastomer blend of claim 2 which contains about 25–30 wt. percent of the halobutyl rubber.
6. The elastomer blend of claim 3 wherein the halobutyl rubber is chlorobutyl.
7. The elastomer blend of claim 6 wherein the high unsaturation rubber is natural rubber.
8. The elastomer blend of claim 6 wherein the elastomer blend is of about 20 wt. percent of terpolymer rubber, about 30 wt. percent of chlorobutyl rubber, and about 50 wt. percent of a high unsaturation rubber.
9. The elastomer blend of claim 3 wherein the non-conjugated diolefin of the terpolymer is selected from the class consisting of 5-methylene-2-norbornene, dicyclopentadiene, 1,4-hexadiene, 4,7,8,9-tetrahydroindene, and 5-ethylidene norbornene.

References Cited

UNITED STATES PATENTS

| 3,508,595 | 4/1970 | Wilson | 260—5 |
| 3,287,440 | 11/1966 | Giller | 260—5 |
| 3,419,639 | 12/1968 | Gentile | 260—5 |
| 3,443,619 | 5/1969 | Kindle | 260—5 |
| 3,451,962 | 6/1969 | Auler et al. | 260—5 |
| 3,492,370 | 1/1970 | Wirth | 260—5 |

FOREIGN PATENTS

| 1,127,102 | 9/1968 | Great Britain | 260—5 |
| 1,484,497 | 5/1967 | France | 260—5 |

OTHER REFERENCES

Ladocsi et al., Def. Pub. of Ser. No. 657,493, filed Aug. 1, 1967, published in 857O.G. 1039 on Dec. 24, 1968.

JOHN C. BLEUTGE, Primary Examiner

U.S. Cl. X.R.

260—23.7 H, 23.7 M, 28.5 B, 33.6 AQ, 41.5 R, 41.5 A, 888, 889